United States Patent
Gurtin et al.

(10) Patent No.: US 10,331,303 B1
(45) Date of Patent: Jun. 25, 2019

(54) SYSTEM, METHOD, AND APPARATUS FOR MAINTAINING AND UPDATING A COMMON MESSAGE USER INTERFACE IN A GROUP BASED COMMUNICATION SYSTEM

(71) Applicant: SLACK TECHNOLOGIES, INC., San Francisco, CA (US)

(72) Inventors: Liza Gurtin, San Francisco, CA (US); Michael Hahn, San Francisco, CA (US)

(73) Assignee: SLACK TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/988,787

(22) Filed: May 24, 2018

(51) Int. Cl.
G06F 3/0482 (2013.01)
H04L 12/58 (2006.01)
G06F 9/451 (2018.01)

(52) U.S. Cl.
CPC ............ *G06F 3/0482* (2013.01); *G06F 9/451* (2018.02); *H04L 51/046* (2013.01)

(58) Field of Classification Search
CPC ..................................................... G06F 3/0482
USPC ........................................................ 715/758
See application file for complete search history.

(56) References Cited

U.S. PATENT DOCUMENTS

| | | | | |
|---|---|---|---|---|
| 8,843,853 | B1* | 9/2014 | Smoak | G06F 3/0482 715/839 |
| 9,955,332 | B2* | 4/2018 | Raleigh | H04W 4/50 |
| 10,193,775 | B2* | 1/2019 | Fletcher | G06F 3/04817 |
| 10,209,956 | B2* | 2/2019 | Fletcher | G06F 3/04817 |
| 2013/0339873 | A1* | 12/2013 | Hrastnik | G06Q 10/10 715/752 |
| 2016/0156584 | A1* | 6/2016 | Hum | H04L 51/32 715/752 |
| 2016/0241609 | A1* | 8/2016 | Xin | H04L 65/403 |
| 2017/0046127 | A1* | 2/2017 | Fletcher | G06F 3/04817 |
| 2017/0046374 | A1* | 2/2017 | Fletcher | G06F 3/0484 |
| 2017/0185592 | A1* | 6/2017 | Frei | G06Q 90/00 |
| 2017/0201850 | A1* | 7/2017 | Raleigh | H04W 4/50 |
| 2017/0277424 | A1* | 9/2017 | Witkowski | G06F 3/04883 |

* cited by examiner

*Primary Examiner* — William D Titcomb
(74) *Attorney, Agent, or Firm* — Alston & Bird LLP

(57) ABSTRACT

Embodiments of the present disclosure provide methods, systems, apparatuses, and computer program products for maintaining and updating a common message user interface (UI) shared among a plurality of group-based communication interfaces in a group-based communication system. The common message UI is rendered based on an updated version or a most up-to-date state of the common message UI when accessed by a client device associated with one of the plurality of group-based communication interfaces.

18 Claims, 9 Drawing Sheets

SYSTEM, METHOD, AND APPARATUS FOR MAINTAINING AND UPDATING A COMMON MESSAGE USER INTERFACE IN A GROUP BASED COMMUNICATION SYSTEM

BACKGROUND

Various messaging systems are available that allow users to exchange messages to conduct continuous device enabled conversations. Applicant has identified a number of deficiencies and problems associated with conventional message exchanging systems. Through applied effort, ingenuity, and innovation, many of these identified problems have been solved by developing solutions that are included in embodiments of the present disclosure, many examples of which are described in detail herein.

BRIEF SUMMARY

This specification relates to maintaining and updating a common message user interface (UI) shared among a plurality of group-based communication interface elements in a group-based communication system. In one embodiment, a computing entity or apparatus is configured to receive a group-based message generating request from an external application. In the embodiment, the group-based message generating request is associated with a common message UI that is configured to be rendered within a selected group-based communication interface element of the plurality of group-based communication interface elements. The apparatus is further configured to generate, using a processor, a common message UI identifier and a common message UI payload. In the embodiment, the common message UI identifier is stored to a common message UI repository in association with the common message UI payload. The apparatus is further configured to receive user interaction data associated with an additional group-based communication interface element of the plurality of group-based communication interface elements from a client device. The apparatus is further configured to parse, using the processor, the user interaction data to identify a common message UI accessing event. In the embodiment, the common message UI accessing event is associated with the external application and the common message UI identifier.

In circumstances where the common message UI accessing event is identified among user interaction data, the apparatus is further configured to retrieve, using the processor, the common message UI payload from the common message UI repository using the common message UI identifier. Finally, the apparatus is further configured to render, to the client device, the common message UI within the additional group-based communication interface element based on the common message UI payload.

In another embodiment, the apparatus is optionally configured to transmit, to the external application, a group-based message generating response in response to the group-based message generating request. In the embodiment, the group-based message generating response comprises the common message UI identifier. The apparatus is optionally configured to receive a common message UI update event associated with the common message UI identifier from the external application or the client device. The apparatus is optionally configured to store an updated common message UI payload to the common message UI repository in association with the common message UI identifier.

The apparatus is optionally configured to transmit, using the processor, a common message UI update notification to the plurality of group-based communication interface elements associated with the common message UI identifier. In the embodiment, the common message UI update notification comprises the common message UI identifier. In the embodiment, the common message UI update notification is transmitted in parallel or in a selected order to the plurality of group-based communication interface elements. The selected order is associated with a most recent access time of the common message UI for each group-based communication interface element.

The apparatus is optionally configured to determine, using the processor, whether the common message UI update notification is received. In circumstances where the common message UI accessing event is identified among the user interaction data and the common message UI update notification is received, the apparatus is optionally configured to retrieve, using the processor, the updated common message UI payload from the common message UI repository using the common message UI identifier. Finally, the apparatus is optionally configured to render, to the client device, the common message UI within the additional group-based communication interface element based on the updated common message UI payload.

In another embodiment, the apparatus is optionally configured to receive a common message UI removal event associated with the common message UI identifier from the external application or the client device. The apparatus is optionally configured to remove, using the processor, the common message UI payload from the common message UI repository is association with the common message UI identifier.

The apparatus is optionally configured to determine whether the common message UI identifier is associated with at least one of the plurality of group-based communication interface elements. In circumstances where the common message UI identifier is determined to be not associated with any one of the plurality of group-based communication interface elements, the apparatus is optionally configured to remove, using the processor, the common message UI payload from the common message UI repository in association with the common message UI identifier after a time period.

In another embodiment, before retrieving, using the processor, the common message UI payload from the common message UI repository using the common message UI identifier, the apparatus is optionally configured to validate, using the processor, whether the client device is authorized to access the common message UI payload. The apparatus is optionally configured to determine, using the processor, whether the common message UI identifier associated with the common message UI payload is generated.

In embodiments, each of the plurality of group-based communication interface elements is a channel list pane, a channel messaging pane, a flexpane, a message, a channel, or a dashboard.

Other embodiments include corresponding systems, methods, and computer programs, configured to perform the operations of the apparatus, encoded on computer storage devices. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
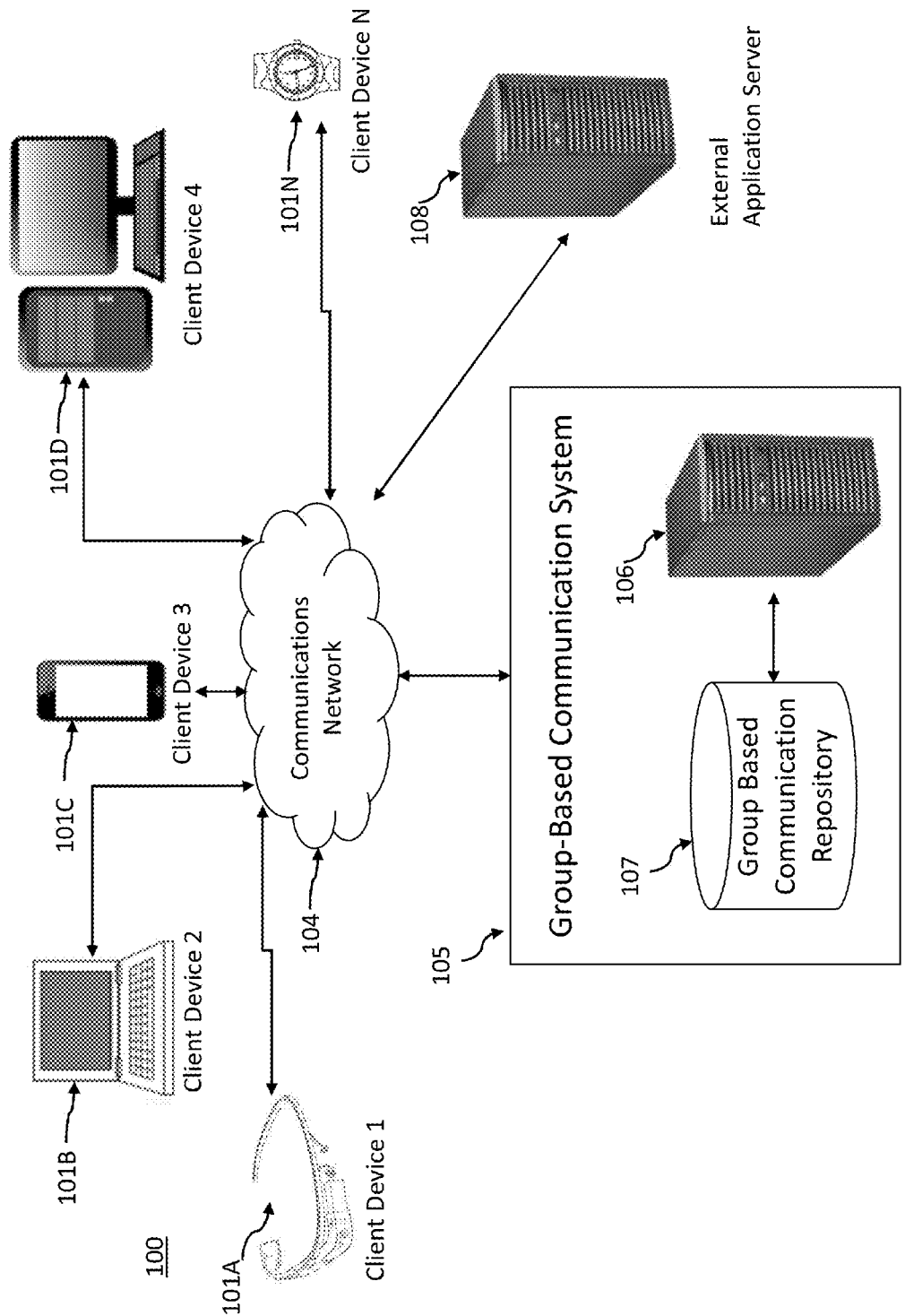
Figure 2:
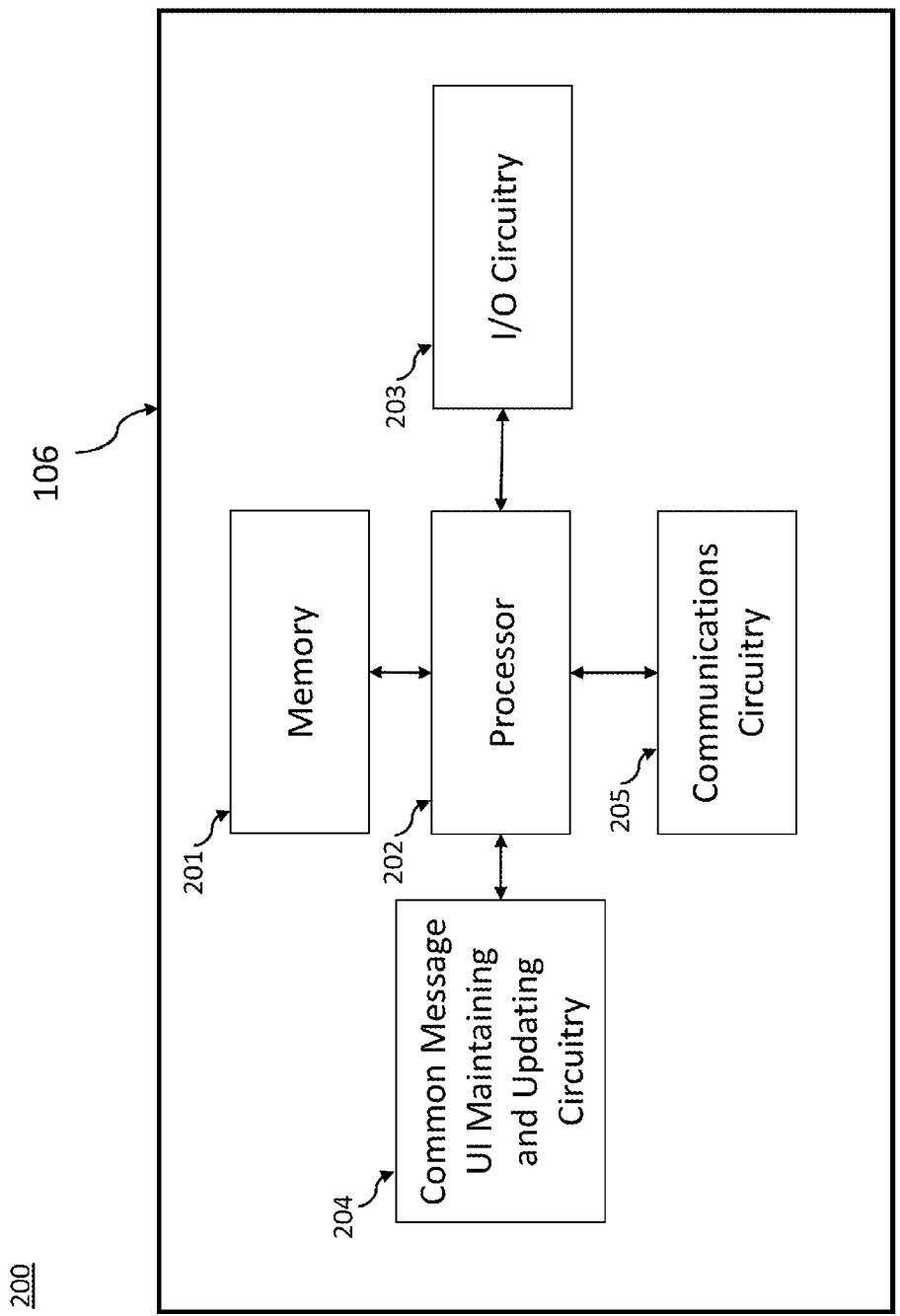
Figure 3:
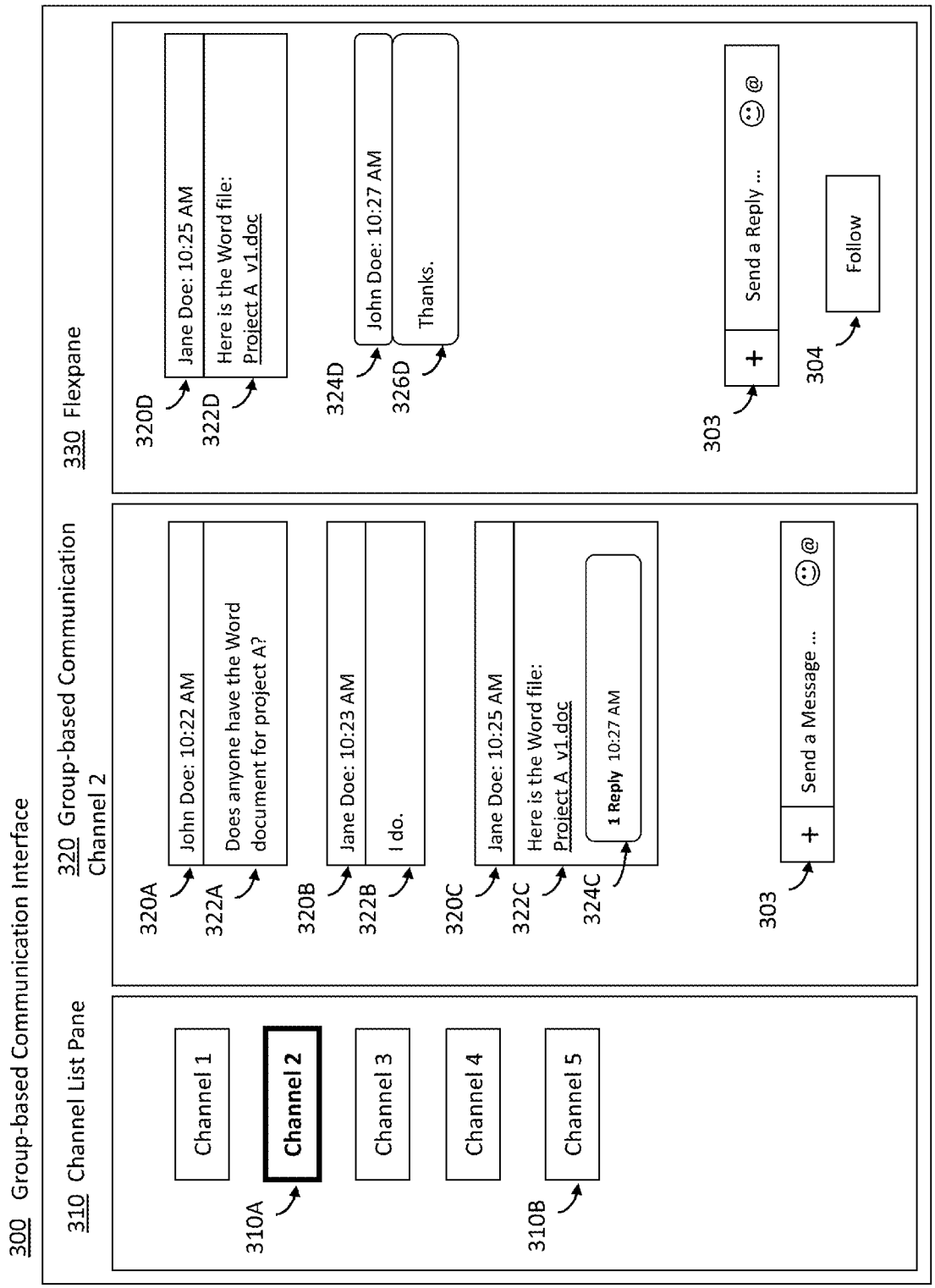
Figure 4:
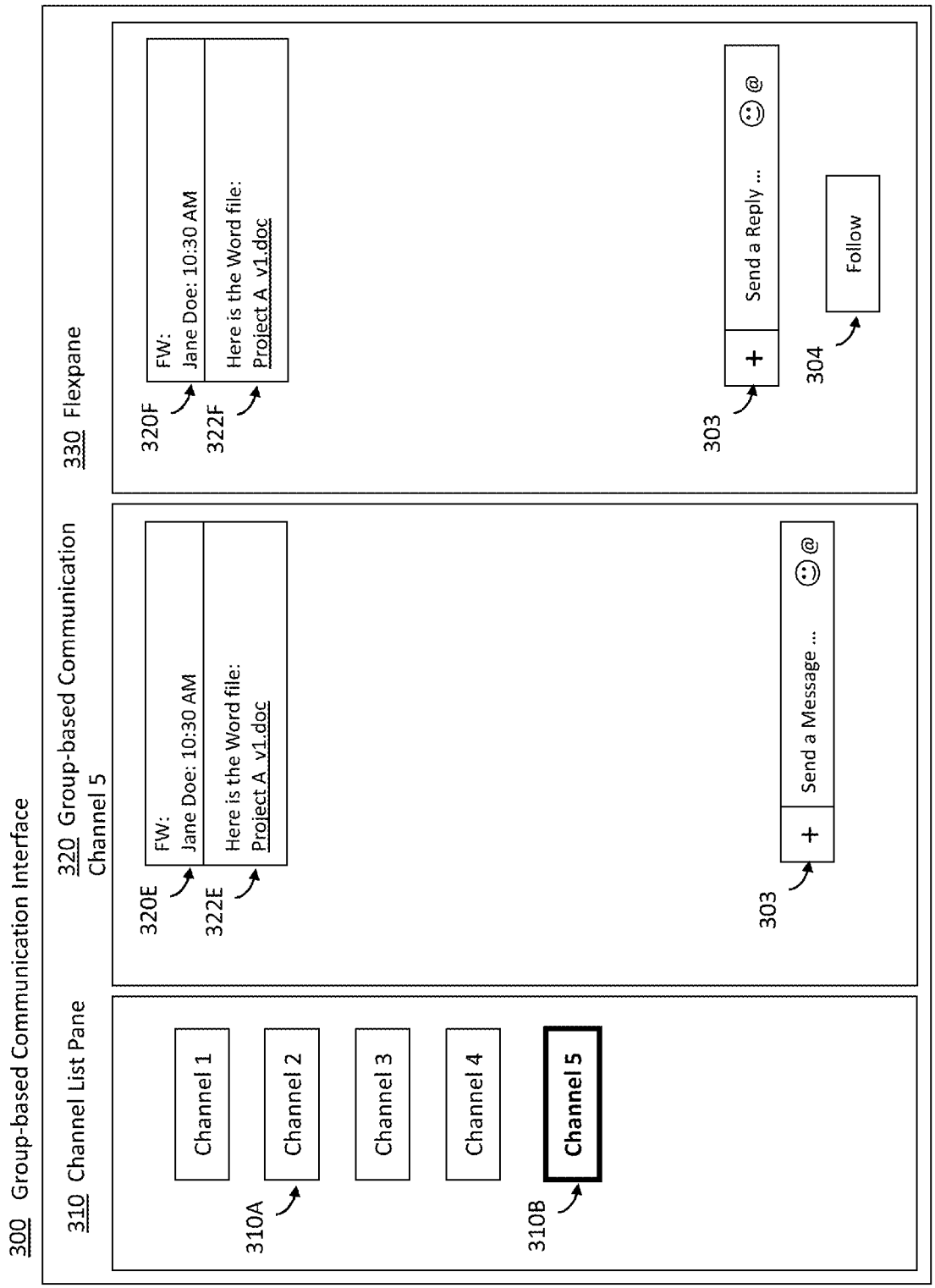
Figure 5:
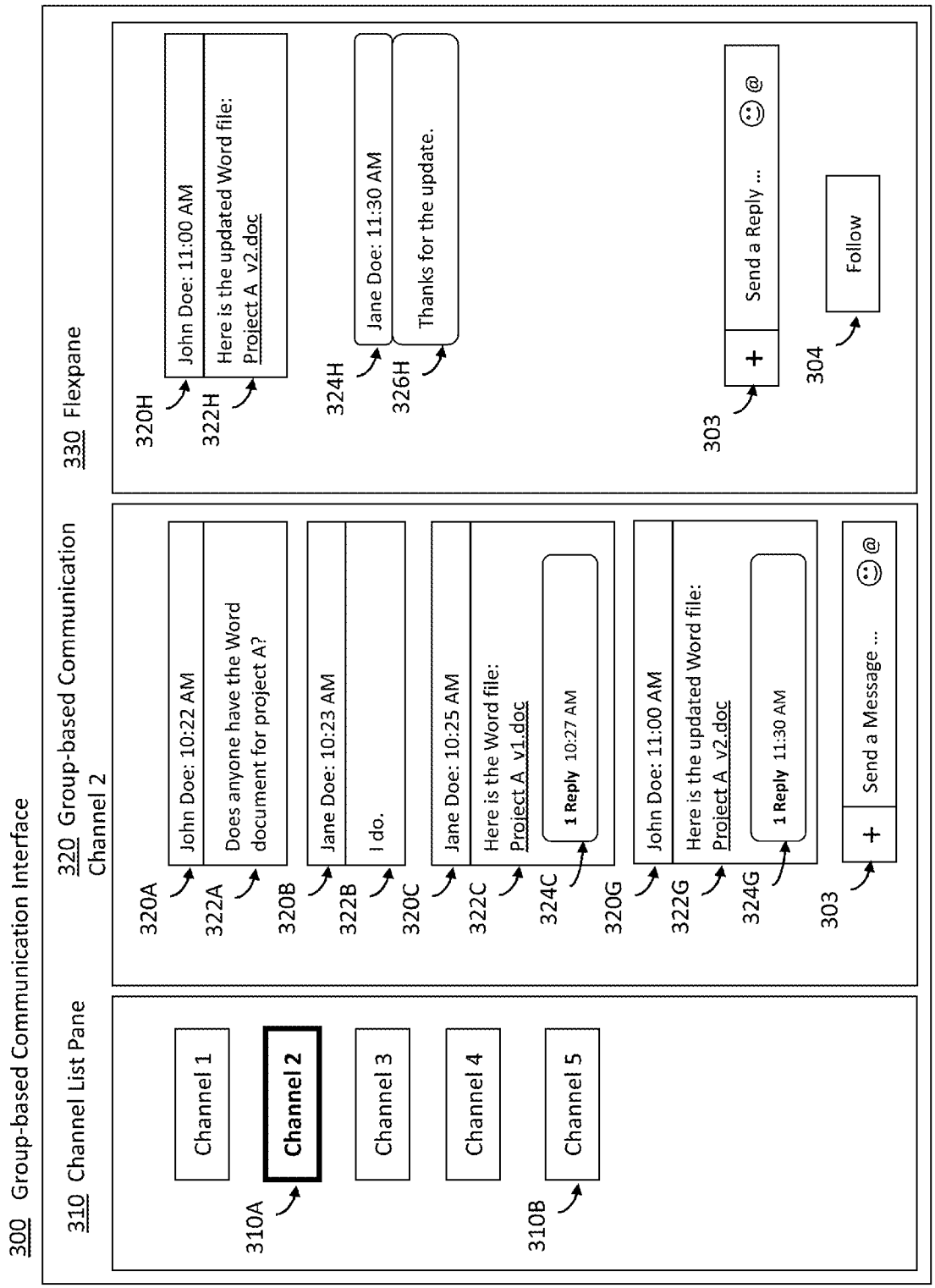
Figure 6:
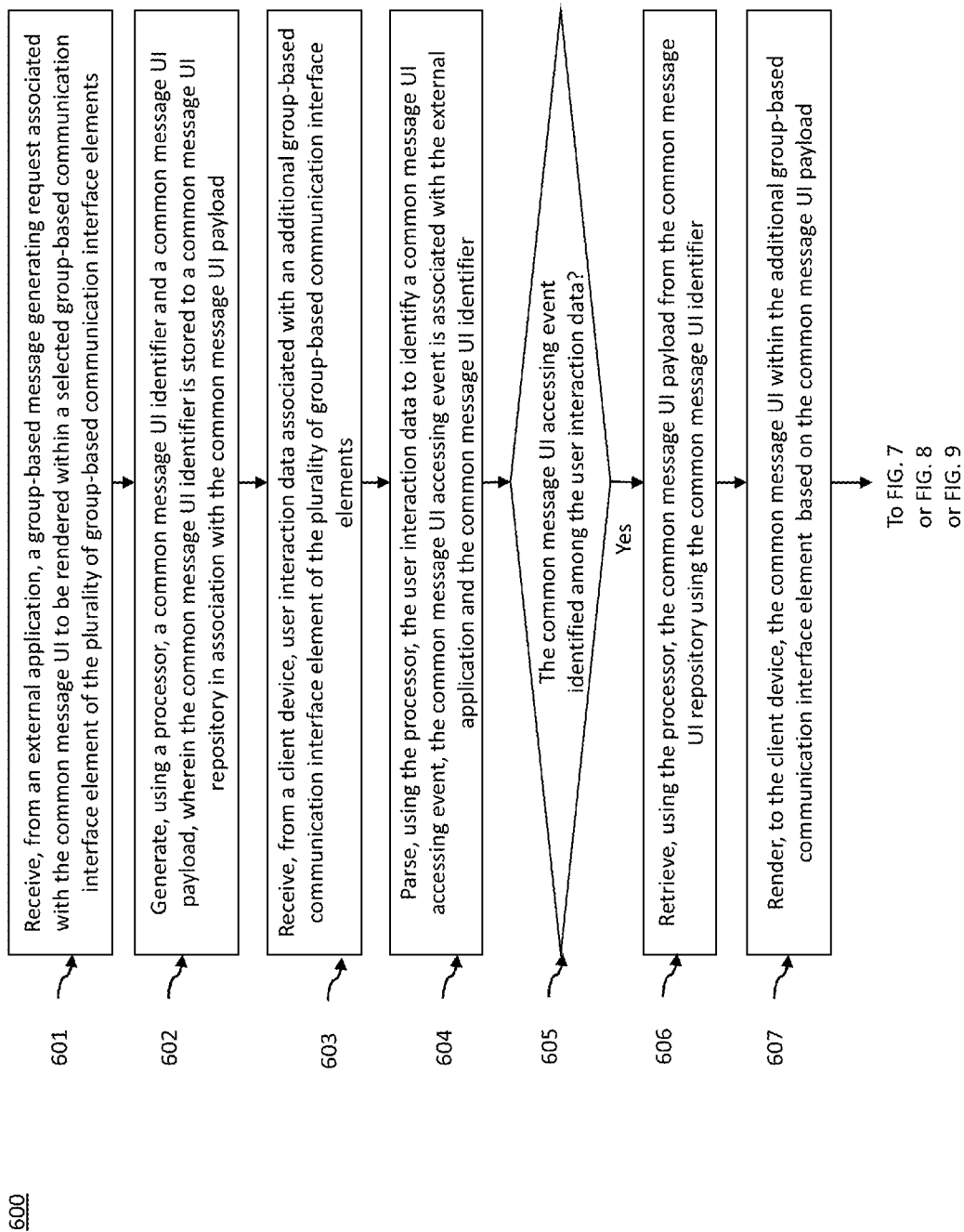
Figure 7:
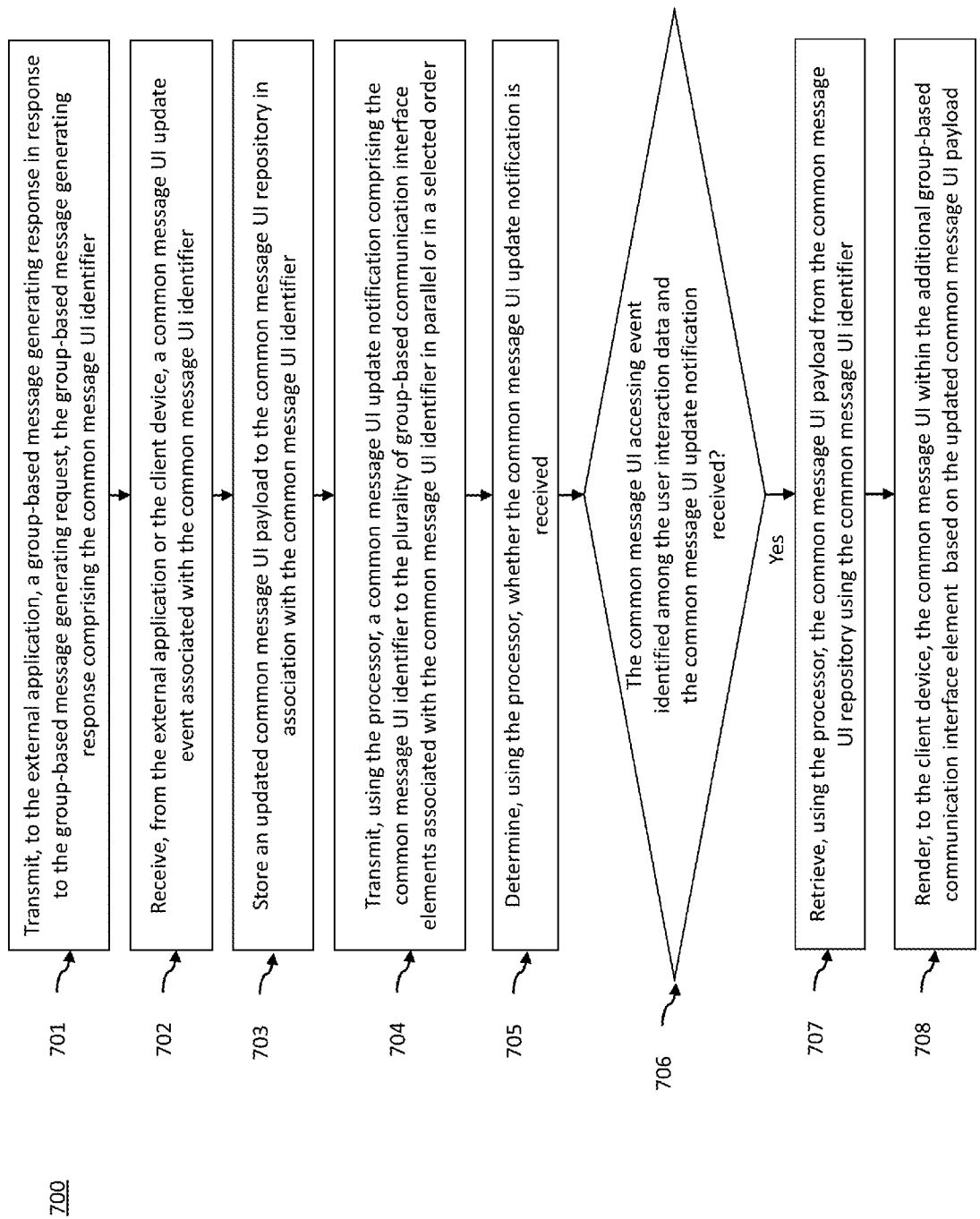
Figure 8:
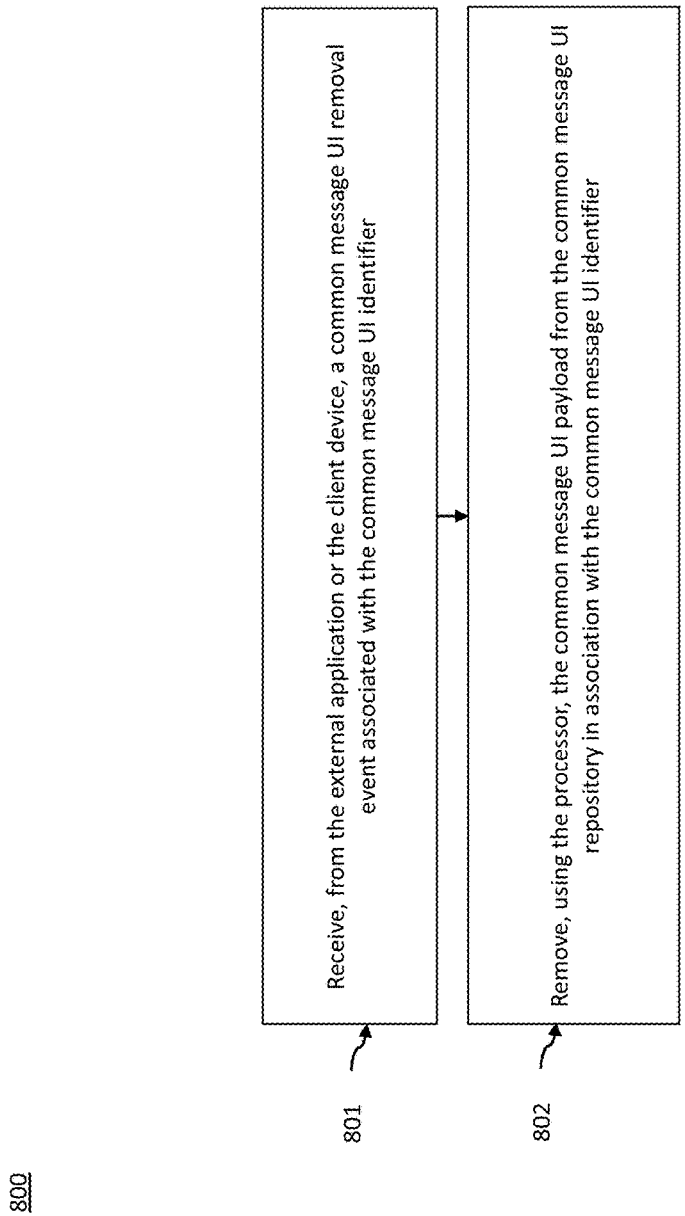
Figure 9:
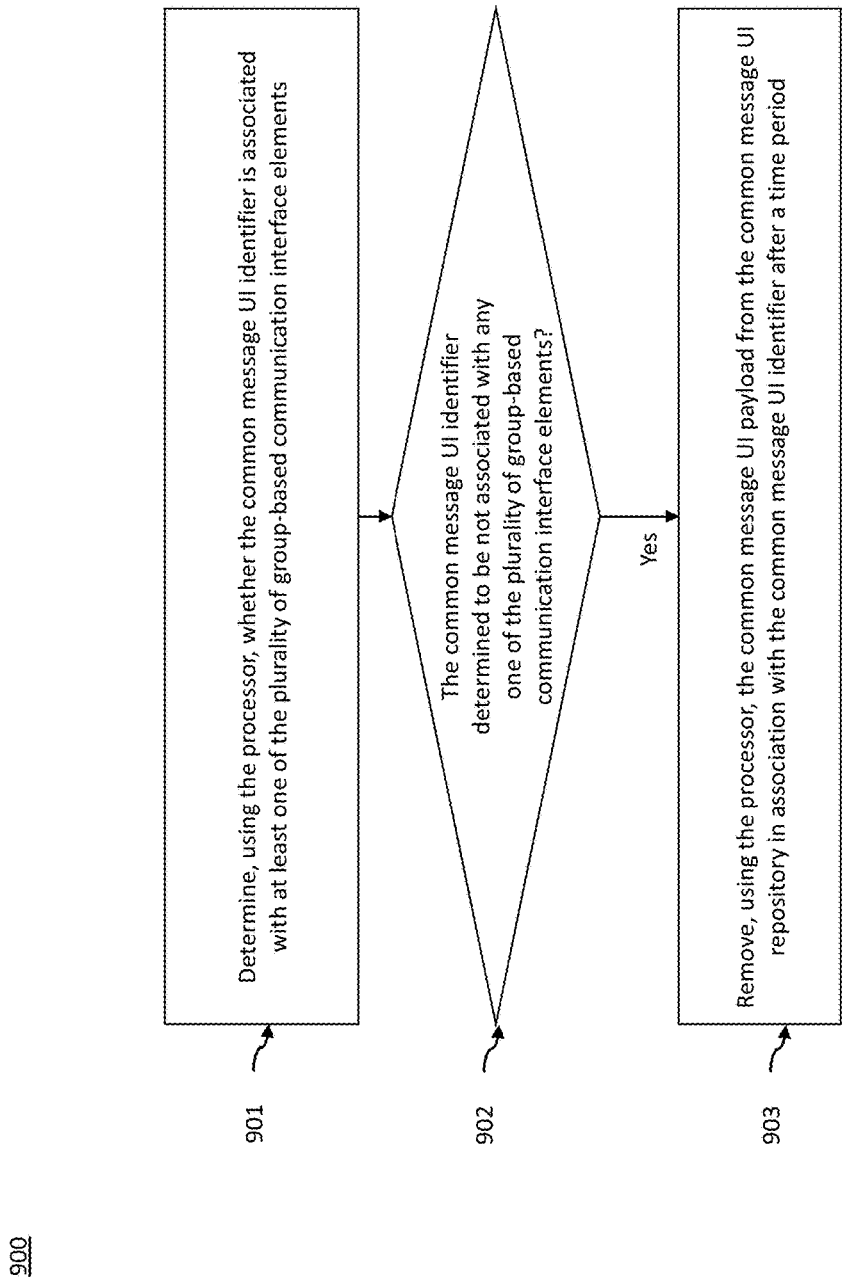

Having thus described the disclosure in general terms, reference will now be made to the accompanying drawings, which are not necessarily drawn to scale, and wherein:

FIG. 1 is a system architecture diagram of a group-based communication system configured to practice embodiments of the present disclosure;

FIG. 2 is an exemplary schematic diagram of a group-based communication server, according to one embodiment of the present disclosure;

FIG. 3 illustrates an exemplary common message UI shared among a group-based communication channel and a flexpane, according to one embodiment of the present disclosure;

FIG. 4 illustrates an exemplary common message UI shared or forwarded to another group-based communication channel and another flexpane, according to one embodiment of the present disclosure;

FIG. 5 illustrates an exemplary updated common message UI shared among a plurality of group-based communication channels and flexpanes, according to one embodiment of the present disclosure;

FIG. 6 illustrates an exemplary flow diagram for generating and rendering a common message UI within an additional group-based communication interface element, according to one embodiment of the present disclosure;

FIG. 7 illustrates an exemplary flow diagram for maintaining and rendering an updated common message UI within the additional group-based communication interface element, according to one embodiment of the present disclosure;

FIG. 8 illustrates an exemplary flow diagram for removing a common message UI payload from a common message UI repository after a common message UI removal event, according to one embodiment of the present disclosure; and FIG. 9 illustrates an exemplary flow diagram for removing a common message UI payload from a common message UI repository after a time period, according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to a method for maintaining and updating a common message UI shared among a plurality of group-based communication interface elements in a group-based communication system. According to the present disclosure, a common message UI identifier and a common message UI payload are generated for displaying a common message UI within a plurality of group-based communication interface elements associated with an external application. In embodiments, whenever a common message UI payload is association with the common message UI identifier is changed (such as being updated to a new version or being removed from a common message UI repository), all of the group-based communication interface elements sharing the common message UI may be changed accordingly.

Instead of storing the updated common message UI payload to a memory or a database that is associated with a selected group-based communication interface element initiating the update event, in the present disclosure, the updated common message UI payload may be maintained, updated and stored to a common message UI repository. By way of the present disclosure, a global or common state of the common message UI may be shared among multiple group-based communication interface elements based on the common message UI identifier and the common message UI payload. In embodiments, a common message UI identifier is introduced and used as a pointer to locate the current or the most up-to-date common message UI payload stored in the common message UI repository for later accessing. By utilizing the relation of the common message UI identifier and the actual memory address for storing the current version of the common message UI payload, embodiments of the present disclosure resolve the issue of updating a common message UI within a selected group-based communication interface element, while automatically updating the common message UI within a plurality of group-based communication interface elements associated with the same common message UI identifier.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and third party resources.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication interface element" refers to a defined area in a group-based communication interface where information is displayed. A group-based communication interface may be configured by a plurality of group-based communication interface elements, such as a channel list pane, a channel messaging pane, a flexpane, a message, a channel, or a dashboard. A "channel list pane" is a display pane configured to display lists of group-based communication channels and/or threads that are configured to indicate when new messaging communications are received in the respective threads and/or group-based communication channels. The channel list pane may include actuators for initiating requests to view selected group-based communication channels and/or a summary of selected threads. The channel list pane may include additional information, such as messaging communication information, notifications, the name of the group, name of the particular member viewing the interface, etc. A "channel messaging pane" is a display pane configured to display a selected group-based communication channel and may display a variety of information and a variety of messages associated with message UIs, notifications, actuators, and indicators/indications. A "flexpane" is a display pane that is configured to display digital contents that is associated with the channel messaging pane, such as a selected thread. The flexpane may include a variety of information, such as messaging communication information, and may include a variety of actuators for initiating requests. The term "selected group-based communication interface element" refers to a group-based communication interface element selected for displaying a message UI (defined below) that is associated with or attached to a group-based message (defined below) communicated within a selected group, a selected channel, or a selected organization. The term "additional group-based communication interface element" refers to another group-based communication interface element selected and added for displaying the same message UI (defined below) that is associated with or attached to another group-based message (defined below) communicated within an additional group, an additional channel, or an additional organization.

The term "group-based communication channel" refers to a virtual communications environment or feed that is configured to display group-based messages posted by channel members (e.g., validated users accessing the environment using client devices) that are viewable only to the members of the group. The format of the group-based communication channel may appear differently to different members of the group-based communication channel; however, the content of the group-based communication channel (i.e., group-based messages) will be displayed to each member of the group-based communication channel. For instance, a common set of group-based messages will be displayed to each member of the respective group-based communication channel such that the content of the group-based communication channel (i.e., group-based messages) will not vary per member of the group-based communication channel.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

The terms "organization identifier" or "business identifier" refer to one or more items of data by which an organization entity or a business entity (e.g., employees of each company may be a separate organization/business) within a group-based communication system may be identified. For example, an organization identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, one or more organization identifiers for organizations with which the user is associated, one or more third party resource provider identifiers indicating whether a client device associated with the user profile is authorized to access respective one or more third party resources, an indication as to whether the user is an owner of any group-based communication channels, an indication as to whether the user has any group-based communication channel restrictions, a plurality of messages, an emoji, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

As used herein, the terms "group-based message" and "message" refer to any electronically generated data or digital content object provided by a user using a client device and that is configured for display within a group-based communication channel. Message communications may include any text, image, video, audio or combination thereof provided by a user (using a client device). For instance, the user may provide a group-based message that includes text as well as an image and a video within the group-based message as message contents. In such a case, the text, image, and video would comprise the group-based message or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Group-based communication system users are organized into organization groups (e.g., employees of each company may be a separate organization group) and each organization group may access a group-based communication interface having one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "user interaction data" refers to data generated based on user interaction with one or more of the client devices. For example, user interaction data may be generated based on group-based messages, inputs, uploads, or other user engagement of a group-based communication interface.

The term "external application" refers to a software program, platform, or service that is configured to communicate with the group-based communication system for providing service to a client device via a group-based communication interface. The external application operates on a compiled code base or repository that is separate and distinct from that which supports the group-based communication system. In some embodiments, the external application may communicate with the group-based communication system, and vice versa, through one or more application program interfaces (APIs). In some embodiments, the external application receives tokens or other authentication credentials that are used to facilitate secure communication between the external application and the group-based communication system in view of group-based communication system network security layers or protocols (e.g., network firewall protocols). Once connected with the remote network device, the external application may transmit messages through the group-based communication system to a targeted client device.

As used herein, the term "message user interface (UI)" refers to an electronically generated platform that, when rendered for display on a client device, provides information associated with a message communicated within the group-based communication system. The message UI enables a user operating the client device to interact or communicate with a server, a processing device, a program, or an external application provided for a group-based communication user interface element of a group-based communication system. For example, the message UI may be in a form of an attachment that is attached to a message communicated within a group-based communication channel. In such an example, the message UI may be displayed under the message enabling a user operating the client device to interact or communicate with a server, a processing device, a program, or an external application associated with the message. In another example, the message UI may be in the form of threaded messages that is attached to a topic thread. In another example, the message UI may be mounted within a user dashboard for rendering user profile or user account details.

The term "common message UI" refers to a message UI that is shared among a plurality of group-based communication interface elements. For example, a common message UI may be shown within a first group-based communication interface element associated with a first group-based communication channel. In such an example, the same common message UI may later be forwarded and shared to a second group-based communication interface element associated with a second group-based communication channel.

The term "common message UI payload" refers to any data or digital content that is associated with a common message UI that, when rendered to a client device, generates the common message UI. The common message UI payload may be any data associated with the intended digital content of the common message UI, or templates or instructions associated with the common message UI. The term "updated common message UI payload" refers to a common message UI payload that is updated by an external application or a client device in association with the common message UI identifier (defined below). The updated common message UI payload includes a new or modified version of digital content based on the original common message UI payload.

As used herein, the term "group-based message generating request" refers to an electronically generated request from an external application for generating group-based messages associated with a common message UI to be rendered within multiple group-based communication interface elements, such as a channel messaging pane or a flexpane. In embodiments, the generated group-based messages may be associated with the same common message UI that is shared among multiple group-based communication interface elements.

As used herein, the term "common message UI identifier" refers to one or more items of data by which a common message UI memory address of a common message UI repository (defined below) may be identified. The common message UI repository is configured to store a common message UI payload associated with a common message UI that is shared among a plurality of group-based communication interface elements. For example, a common message UI identifier may comprise ASCII text, a pointer, a memory address, and the like.

As used herein, the term "common message UI repository" refers to a memory or a database that is associated with common message UI identifiers used for identifying or tracking an electronically generated common message UI memory address of the memory or the database storing the common message UI payload. The common message UI memory address may be defined by bytes. For example, the common message UI memory address may be a binary address defined by an ordered and finite sequence of binary numbers that holds up to one byte. In such an example, the common message UI identifier allows a processor to track, based on the one byte sequence of binary numbers, the common message UI memory address where the common message UI payload is stored within.

As used herein, the term "group-based message generating response" refers to an electronically generated response from a group-based communication server that may provide data associated with the group-based messages to the external application initiating the group-based message generating request. A group-based message generating response may include the common message UI identifier that is generated for locating a common message UI memory address in a common message UI repository.

The term "common message UI accessing event" refers to an action, incident, collection of steps, or processes executed, via a client device, by a user associated with a group-based communication interface element for accessing a common message UI that is identifiable by a server and may be correlated to one or more external applications. Accessing events may be pre-defined (e.g., button clicks, slash commands, etc.) or may be learned by the group-based communication system over time using machine learning models or other similar techniques. In example embodiments, once a common message UI accessing event is identified, the group-based communication server is configured to retrieve a common message UI identifier associated with the common message UI to be accessed, locate the common message UI payload stored in the common message UI repository based on the retrieved common message UI identifier, and retrieve and render for display the common message UI payload stored in the common message UI repository.

The term "common message UI update event" refers to an action, incident, collection of steps, or processes executed, via a client device, by a user associated with a group-based communication interface element for updating a common message UI that is identifiable by a server and may be correlated to one or more external applications. The term may also refer to an action, incident, collection of steps, or processes executed, via an external application server, by an external application provider for updating a common message UI that is identifiable by a server and may be shared among group-based communication interface elements. Update events may be pre-defined (e.g., button clicks, slash commands, etc.) or may be learned by the group-based communication system over time using machine learning models or other similar techniques. In example embodiments, once a common message UI update event is identified, the group-based communication server is configured to transmit a common message UI update notification (defined below) comprising the common message UI identifier to multiple group-based communication interface elements associated with the same common message UI identifier. In embodiments, the common message UI update notification may be transmitted in parallel or in a selected order based on a most recent access time associated with each group-based communication interface element.

It should be appreciated that the term "in parallel" refers to circumstances where two or more events occur within a time period that is less than, often considerably less than, a time period that would be required if such events occurred sequentially or in series. The term "in parallel" is not used in an absolute sense and does not require that events or tasks occur in an identical or precisely synchronized time period. For example, if two messages generated in parallel by two computing entities, then such messages are generated in a time period that is less than that which would be required if such messages were generated sequentially. In other words, the time period needed to generate the first message is at least partly coextensive with (and often substantially overlaps) the time period needed to generate the second message.

The term "access time" refers to an electronic record of time (e.g., a timestamp) representing the time when a client device associated with a group-based communication interface element initiated a common message UI accessing event by way of sending user interaction data to a group-based communication server for accessing the common message UI. The group-based communication server, when received the user interaction data, may parse the user interaction data to identify a common message UI accessing event and an access time associated with the common message UI for the group-based communication interface element. The term "most recent access time" refers to an electronic record of time (e.g., a timestamp) representing the latest access time when a client device associated with a group-based communication interface element initiated a common message UI accessing event for accessing the common message UI.

The term "common message UI update notification" refers to an electronically generated notification from a group-based communication server that may provide the common message UI identifier associated with an updated common message UI payload to all group-based communication interface elements associated with the common message UI identifier for updating the original common message UI payload to a current version for later accessing events initiated by client devices.

The term "common message UI removal event" refers to an action, incident, collection of steps, or processes executed, via a client device, by a user associated with a group-based communication interface element for removing or deleting a common message UI that is identifiable by a server and may be correlated to one or more external applications. The term may also refer to an action, incident, collection of steps, or processes executed, via an external application server, by an external application provider for removing a common message UI that is identifiable by a server and shared among multiple group-based communication interface elements. Removal events may be predefined (e.g., button clicks, slash commands, etc.) or may be learned by the group-based communication system over time using machine learning models or other similar techniques. In example embodiments, once a common message UI removal event is identified, the group-based communication server is configured to remove the current common message UI payload from the common message UI repository in associated with the common message UI identifier.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. An external application server 108 may interact with a group-based communication system 105 via a communications network 104. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N or the external application server 108. For example, the group-based communication server 106 may be operable to receive and post or transmit group-based messages provided by the client devices 101A-101N or the external application server 108.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or a group-based message may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML, version="1.0" encoding="UTF-8"?>
<auth_request>
<timestamp>2020-12-31 23:59:59</timestamp>
<user_accounts_details>
    <user_account_credentials>
        <user_name>ID_user_1</user_name>
        <password>abc123</password>
        //OPTIONAL <cookie>cookieID</cookie>
        //OPTIONAL
            <digital_cert_link>www.mydigitalcertificate.com/
            JohnDoeDaDoeDoe@gmail.com/mycertifcat-
            e.dc</digital_cert_link>
        //OPTIONAL  <digital_certificate>_DATA_</digi-
            tal_certificate>
    </user_account_credentials>
</user_accounts_details>
<client_details>//iOS Client with App and Webkit
    //it should be noted that although several client details
    //sections are provided to show example variants of
        client
    //sources, further messages will include only on to save
    //space
    <client_IP>10.0.0.123</client_IP>
    <user_agent_string>Mozilla/5.0 (iPhone; CPU iPhone
        OS 7_1_1 like Mac OS X) AppleWebKit/537.51.2
        (KHTML, like Gecko) Version/7.0 Mobile/11D201
        Safari/9537.53</user_agent_string>
    <client_product_type>iPhone6,1</client_
        product_type>
    <client_serial_number>DNXXX1X1XXXX</client_
        serial_number>
    <client_UDID>3XXXXXXXXXXXXXXXXXXX-
        XXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>NickName.app</app_name>
    <app_version>1.0</app_version>
    <app_webkit_name>Mobile    Safari</client_webkit_
        name>
    <client_version>537.51.2</client_version>
</client_details>
<client_details>//iOS Client with Webbrowser
    <client_IP>10.0.0.123</client_IP>
    <user_agent_string>Mozilla/5.0 (iPhone; CPU iPhone
        OS 7_1_1 like Mac OS X) AppleWebKit/537.51.2
        (KHTML, like Gecko) Version/7.0 Mobile/11D201
        Safari/9537.53</user_agent_string>
    <client_product_type>iPhone6,1</client_
        product_type>
    <client_serial_number>DNXXX1X1XXXX</client_
        serial_number>
    <client_UDID>3XXXXXXXXXXXXXXXXXXX-
        XXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details>//Android Client with Webbrowser
    <client_IP>10.0.0.123</client_IP>
    <user_agent_string>Mozilla/5.0 (Linux; U; Android
        4.0.4; en-us; Nexus S Build/IMM76D) AppleWeb-
        Kit/534.30 (KHTML, like Gecko) Version/4.0
        Mobile Safari/534.30</user_agent_string>
    <client_product_type>Nexus S</client_product_type>
    <client_serial_number>YXXXXXXXXZ</client_se-
        rial_number>
    <client_UDID>FXXXXXXXXX-XXXX-XXXX-
        XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details>//Mac Desktop with Webbrowser
    <client_IP>10.0.0.123</client_IP>
    <user_agent_string>Mozilla/5.0 (Macintosh; Intel Mac
        OS X 10_9_3) AppleWebKit/537.75.14 (KHTML,
        like Gecko) Version/7.0.3 Safari/537.75.14</user_
        agent_string>
    <client_product_type>MacPro5,1</client_
        product_type>
    <client_serial_number>YXXXXXXXXZ</client_se-
        rial_number>
    <client_UDID>FXXXXXXXXX-XXXX-XXXX-
        XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_iden-
        tifier>
    <team_identifier>ID_team_1</team_identifier>
    <channel_identifier>ID_channel_1</channel_identi-
        fier>
    <contents>That is an interesting invention. I have
        attached a copy our patent policy.</contents>
    <attachments>patent_policy.pdf</attachments>
</message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

POST/storage_message.php HTTP/1.1
Host: www.server.com
Content-Type: Application/XML
Content-Length: 667
<?XML, version="1.0" encoding="UTF-8"?>
<storage_message>
  <message_identifier>ID_message_10</message_identifier>
  <team_identifier>ID_team_1</team_identifier>
  <channel_identifier>ID_channel_1</channel_identifier>
  <sending_user_identifier>ID_user_1</sending_user_identifier>
  <topics>
    <topic>inventions</topic>
    <topic>patents</topic>
    <topic>policies</topic>
  </topics>
  <responses>
    <response>liked by ID_user_2</response>
    <response>starred by ID_user_3</response>
  </responses>
  <contents>That is an interesting invention. I have attached a copy our patent policy.</contents>
  <attachments>patent_policy.pdf</attachments>
  <conversation_primitive>
    conversation includes messages: ID_message_8, ID_message_9, ID_message_10, ID_message_11, ID_message_12
  </conversation_primitive>
</storage_message>

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may channels associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, message UIs, such as attachments, may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

FIG. 2 illustrates an exemplary schematic diagram of a group-based communication server 200 that may be embodied by one or more computing systems. The group-based communication server 200 may include a processor 202, a memory 201, input/output circuitry 203, communications circuitry 205, and common message UI maintaining and updating circuity 204. The group-based communication server 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the group-based communication server 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the group-based communication server 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the group-based communication server 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The common message UI maintaining and updating circuity 204 includes hardware configured to support a group-based communication system. The common message UI maintaining and updating circuity 204 may utilize processing circuitry, such as the processor 202, to perform these actions. The common message UI maintaining and updating circuity 204 may send and/or receive data from group-based communication repository 107. In some implementations, the sent and/or received data may be of enterprise-based digital content objects organized among a plurality of group-based communication channels. In some implementations, the sent and/or received data may be of enterprise-based digital content objects to be rendered within a plurality of group-based communication interface elements. It should also be appreciated that, in some embodiments, the common message UI maintaining and updating circuity 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Maintaining and Updating a Common Message User Interface (UI) in a Group-Based Communication System FIG. 3 illustrates an exemplary common message UI shared among a group-based communication channel 320 and a flexpane 330, according to one embodiment of the present disclosure. In embodiments, a group-based communication interface 300 may comprise a plurality of group-based communication interface elements, such as the channel list pane 310, a channel messaging pane 320 associated with the group-based communication channel 2, a flexpane 330 associated with a selected thread, group-based messages 320A-320D, or a dashboard such as a user dashboard comprising user profile data (not shown in FIG. 3). Each of the group-based communication interface element may be displayed on client devices 101A-101N. In embodiments, the message input field 303 may be provided within the channel messaging pane 320 or the flexpane 330, such that a user may interact or communicate with the group-based communication server 106 and a message UI may be generated based on the user's interaction or communication with the group-based communication server 106. In embodiments the follow button 304 may be provided within the flexpane 330, such that a user may select to follow specific threads they are interested in.

As illustrated in FIG. 3, the group-based communication interface 300 may be associated with different group-based communication channels (Channel 1-Channel 5) and are presented within the channel list pane 310 on a display of client devices 101A-101N. Once a specific group-based communication channel is selected based on user's interaction with the channel list pane 310, the specific group-based communication channel may be displayed within the channel messaging pane 320. For example, when a user interacted with the channel list pane 310 by clicking on the Channel 2 button 310A, group-based messages 320A-320C associated with Channel 2 may be rendered within the channel messaging pane 320. In embodiments, threads associated with a selected group-based message may further be displayed based on user's interaction with the flexpane 330. For example, when a user interacted with the channel list pane 310 by clicking on the group-based message 320C, threads associated with the group-based message 320C may be rendered within the flexpane 330.

Each group-based message displayed within the channel messaging pane 320 may comprise group-based message information, which includes user information identifying a user who sent the group-based message, a timestamp indicating when the group-based message was sent, and a message UI generated in a form of an attachment and displayed under the group-based message for providing information associated with the message. For example, group-based message 320A includes user information "John Doe," a timestamp "10:22 AM," and a message UI 322A attached to the group-based message 320A and comprising a text block showing "Does anyone have the Word document for project A?" For another example, group-based message 320B includes user information "Jane Doe," a timestamp "10:23 AM," and a message UI 322B attached to the group-based message 320B and comprising a text block showing "I do." For another example, group-based message 320C includes user information "Jane Doe," a timestamp "10:25 AM," and a message UI 322C attached to the group-based message 320C and comprising a text block showing "Here is the Word file:," a link to "Project A_v1.doc," and a thread block 324C indicating there is one reply to the group-based message 320C.

Threads displayed within the flexpane 330 may comprise the selected group-based message and its related replying messages. For example, threads shown in FIG. 3 include the selected group-based message 320D generated based on the original group-based message 320C and its related one replying message 324D. Similarly, each selected group-based message and its related replying messages may include the selected group-based message information, which includes user information identifying a user who sent the group-based message, a timestamp indicating when the selected group-based message was sent, and a message UI generated in a form of an attachment and displayed under the group-based message for providing information associated with the message. For example, the selected group-based message 320D generated based on the original group-based message 320C includes user information "Jane Doe," a timestamp "10:25 AM," and a message UI 322D attached to the group-based message 320D and comprising a text block showing "Here is the Word file:," a link to "Project A_v1.doc." Further, the related replying message is displayed and shown as 324D that includes user information "John Doe," a timestamp "10:27 AM," and a message UI 326D attached to the selected group-based message 320D and comprising a text block showing "Thanks."

In the exemplary embodiment, the group-based messages 320A-320D are uniformly rendered to each user viewing the group-based communication interface associated with the selected Channel 2. For the purposes described herein, the user may interact or communicate with the group-based communication server 106 utilizing the message input field 303. And a message UI may be generated based on the user's interaction or communication with the group-based communication server 106. For example, the user, John Doe using a client device may input or enter "Does anyone have the Word document for project A?" into the message input field 303. And based on the content John Doe keyed or entered, a message UI 322A may be generated and rendered within the group-based communication interface 300 by way of attaching a text block under the user information or timestamp of the group-based messages 320A. Another user, Jane Doe using another client device, when viewed the group-based message 320A posted by John Doe, may input or enter "I do." into the message input field 303. Further, Jane Doe may input or enter "Here is the Word file:" and upload the Word file "Project A_v1.doc" using the message input field 303. And based on the content Jane Doe keyed or entered, a message UI 322C may be generated and rendered within the channel messaging pane 320 associated with Channel 2 by way of attaching the Word file "Project A_v1.doc" to a text block under the user information or timestamp of the group-based message 320C. In circumstances where Jane Doe would like to share the same Word file from Channel 2 to Channel 5, Jane Doe may forward the group-based message 320C to another channel messaging pane 320 associated with Channel 5 to form the group-based message 320E as shown in FIG. 4.

FIG. 4 illustrates an exemplary common message UI shared or forwarded to another group-based communication channel and another flexpane, according to one embodiment of the present disclosure. In the embodiment, group-based messages associated with a common message UI may be shared among different group-based communication interface elements. For example, group-based messages associated with a common message UI comprising a text block showing "Here is the Word file:" and a link to "Project A_v1.doc" may be shared between channel messaging panes and flexpanes that are associated with Channel 2 and Channel 5. In such an embodiment, the group-based messages 320C and 320D may be presented on a display of a client device that is associated with Channel 2, while the group-based messages 320E and 320F may be presented on a display of another client device that is associated with Channel 5. In such an embodiment, the group-based messages 320C, 320D, 320E, and 320F may share the common message UI (such as 322C, 322D, 322E, and 322F) comprising the same Word file: Project A_v1.doc as an attachment.

FIG. 5 illustrates an exemplary updated common message UI shared among a plurality of group-based communication channels and flexpanes, according to one embodiment of the present disclosure. In embodiments, user John Doe may upload a new version of the updated Word file as "Project A_v2.doc" using the message input field 303 within the channel messaging pane 320 associated with Channel 2. And based on the updated Word file John Doe uploaded, an updated message UI 322G associated with the original message UI 322C may be generated and rendered within the channel messaging pane 320 associated with Channel 2 by way of attaching the updated Word file "Project A_v2.doc" to a text block under the user information or timestamp of the group-based message 320G. According to the embodiment of the present disclosure, group-based messages 320E and 320F (illustrated in FIG. 4) that are shared and forwarded based on the original common message UI 322C may be automatically associated with the updated common message UI 322G comprising the updated Word file "Project A_v2.doc". In the embodiment, when a client device associated with Channel 5 would like to access the Word file, the group-based communication server 106 may automatically retrieve the updated common message UI payload in a common message UI repository storing the updated Word file "Project A_v2.doc," and further render for display the updated Word file "Project A_v2.doc" on the client device.

FIG. 6 illustrates an exemplary flow diagram for generating and rendering a common message UI within an additional group-based communication interface element, according to one embodiment of the present disclosure. The method 600 begins with receiving a group-based message generating request from an external application (601). The group-based message generating request is associated with the common message UI to be rendered within a selected group-based communication interface element of the plurality of group-based communication interface elements. In embodiments, the group-based communication interface element may be a channel list pane, a channel messaging pane, a flexpane, a message, a channel, or a dashboard that is associated with user profile information.

The method 600 further continues with generating, using a processor 202, a common message UI identifier and a common message UI payload (602). In embodiments, the common message UI identifier is stored to a common message UI repository in association with the common message UI payload. For example, as shown in FIG. 3, group-based messages 320C and 320D are associated with a common message UI (e.g., the Word file "Project A_v1.doc"). In such an example, a common message UI identifier and a common message UI payload that are associated with the common message UI (e.g., the Word file "Project A_v1.doc") are generated. In embodiments, a common message UI identifier is generated for identifying a memory address in a common message UI repository for storing the common message UI payload. The common message UI payload may include digital content of the Word file "Project A_v1.doc."

The method 600 further continues with receiving, from a client device (e.g., 101A-101N), user interaction data associated with an additional group-based communication interface element of the plurality of group-based communication interface elements (603). The method 600 further continues with parsing, using the processor, the user interaction data to identify a common message UI accessing event (604). In embodiments, the common message UI accessing event is associated with the external application and the common message UI identifier. The common message UI accessing event may be identified among user interaction data for determining whether the user engagement of the additional group-based communication interface element is to access a common message UI associated with the external application and the common message UI identifier.

In circumstances where the common message UI accessing event is identified among the user interaction data (605), the method 600 further continues with retrieving, using the processor 202, the common message UI payload from the common message UI repository using the common message UI identifier (606). For example, as illustrated in FIG. 3, the processor 202 may be used to retrieve the common message UI identifier generated for retrieving the common message UI payload (e.g., the digital content of the Word file "Project A_v1.doc") stored to the common message UI repository. Finally, the method 600 further continues with rendering, to the client device (e.g., 101A-101N), the common message UI within the additional group-based communication interface element based on the common message UI payload (607). For example, as illustrated in FIG. 3, the common message UI payload (e.g., the digital content of Word file "Project A_v1.doc") may be rendered to a client device operated by a user who initiated the common message UI accessing event and is associated with Channel 2 or Channel 5.

In embodiments, before retrieving, using the processor 202, the common message UI payload from the common message UI repository using the common message UI identifier, the method 600 optionally continues with validating, using the processor 202, whether the client device is authorized to access the common message UI payload. And the method 600 optionally continues with determining, using the processor 202, whether the common message UI identifier associated with the common message UI payload is generated.

FIG. 7 illustrates an exemplary flow diagram for maintaining and rendering an updated common message UI within the additional group-based communication interface element, according to one embodiment of the present disclosure. Following FIG. 6, the method 700 continues with transmitting a group-based message generating response in response to the group-based message generating request to the external application (701). In embodiments, the group-based message generating response may comprise the common message UI identifier.

The method 700 continues with receiving, from the external application 108 or the client device (e.g., 101A-101N), a common message UI update event associated with the common message UI identifier (702). For example, as shown in FIG. 5, a common message UI update event associated with the updated common message UI payload (e.g., the digital content of Word file "Project A_v2.doc") may be received from a client device. In such an example, the common message UI update event may be initiated by user's interaction with a client device such as uploading the updated common message UI (e.g., the Word file "Project A_v2.doc") via the message input field 303 within the channel messaging pane 320 associated with Channel 2.

The method 700 further continues with storing an updated common message UI payload to the common message UI repository (703). For example, as illustrated in FIG. 5, the updated common message UI payload (e.g., the digital content of Word file "Project A_v2.doc") may be stored to the common message UI repository where the original common message UI payload (e.g., the digital content of Word file "Project A_v1.doc") is stored.

The method 700 further continues with transmitting, using the processor 202, a common message UI update notification to the plurality of group-based communication interface elements that are associated with the common message UI identifier in parallel or in a selected order (704). In embodiments, the common message UI update notification may comprise the common message UI identifier. In embodiments, the selected order may be associated with a most recent access time of the common message UI for each group-based communication interface element. For example, a common message UI update notification comprising the common message UI identifier (e.g., the common message UI identifier associated with the updated common message UI 322G comprising the updated Word file "Project A_v2.doc") may be transmitted to Channel 2 and Channel 5 in parallel or in a selected order. In such an example, the common message UI update notification may be broadcasted to Channel 2 and Channel 5 substantially simultaneously. In such an example, the common message UI update notification may also be transmitted to Channel 2 and Channel 5 based on a most recent access time of the common message UI (e.g., the Word file "Project A_v1.doc") associated with each channel. For example, the common message UI update notification may be transmitted to Channel 5 first, since the group-based message 320E has a timestamp showing the most recent access time of the common message UI (e.g., the Word file "Project A_v1.doc") associated with Channel 5 is approximately at 10:30 AM when a user clicked on the Word file "Project A_v1.doc" link. Then, the common message UI update notification may later be transmitted to Channel 2, since the group-based message 320C has a timestamp showing the most recent access time of the common message UI (e.g., the Word file "Project A_v1.doc") associated with Channel 2 is approximately at 10:25 AM when a user clicked on the Word file "Project A_v1.doc" link.

The method 700 further continues with determining, using the processor 202, whether the common message UI update notification is received (705). In circumstances where the common message UI accessing event is identified among the user interaction data and the common message UI update notification is received (706), the method 700 further continues with retrieving, using the processor 202, the updated common message UI payload from the common message UI repository using the common message UI identifier (707). For example, as illustrated in FIG. 4, when a user associated with Channel 5 is intended to access the common message UI payload (e.g., the digital content of Word file "Project A_v1.doc") by clicking on the link shown within the common message UI 322E, the processor 202 may be used to retrieve the updated common message UI payload (e.g., the digital content of Word file "Project A_v2.doc") stored in the common message UI repository based on the common message UI identifier shared between Channel 2 and Channel 5.

The method 700 finally continues with rendering, to the client device (e.g., 101A-101N), the common message UI within the additional group-based communication interface element based on the updated common message UI payload (708). For example, as illustrated in FIG. 4, after the original common message UI payload is being updated and uploaded, the updated common message UI payload (e.g., the digital content of Word file "Project A_v2.doc") may be rendered to a client device operated by a user, associated with Channel 2 or Channel 5, who initiated the common message UI accessing event to access the common message UI.

FIG. 8 illustrates an exemplary flow diagram for removing a common message UI payload from a common message UI repository after a common message UI removal event, according to one embodiment of the present disclosure. The method 800 begins with receiving, from the external application 108 or the client device (e.g., 101A-101N), a common message UI removal event associated with the common message UI identifier (801). The method 800 further continues with removing, using the processor 202, the common message UI payload from the common message UI repository in association with the common message UI identifier (802).

FIG. 9 illustrates an exemplary flow diagram for removing a common message UI payload from a common message UI repository after a time period, according to one embodiment of the present disclosure. The method 900 begins with determining, using the processor 202, whether the common message UI identifier is associated with at least one of the plurality of group-based communication interface elements (901). In circumstances where the common message UI is determined to be not associated with any one of the plurality of group-based communication interface elements (902), the method 900 further continues with removing, using the processor 202, the common message UI payload from the common message UI repository in association with the common message UI identifier after a time period (903).

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for maintaining and updating a common message user interface (UI) shared among a plurality of group-based communication interface elements in a group-based communication system, the apparatus comprising at least one processor and at least one memory including computer program code, the at least one memory and the computer program code configured to, with the at least one processor, cause the apparatus to:
   receive, from an external application, a group-based message generating request associated with the common message UI to be rendered within a selected group-based communication interface element of the plurality of group-based communication interface elements;
   generate, using a processor, a common message UI identifier and a common message UI payload, wherein the common message UI identifier is stored to a common message UI repository in association with the common message UI payload;
   receive, from a client device, user interaction data associated with an additional group-based communication interface element of the plurality of group-based communication interface elements;
   parse, using the processor, the user interaction data to identify a common message UI accessing event, the common message UI accessing event is associated with the external application and the common message UI identifier;
   in circumstances where the common message UI accessing event is identified among the user interaction data:
      retrieve, using the processor, the common message UI payload from the common message UI repository using the common message UI identifier; and
      render, to the client device, the common message UI within the additional group-based communication interface element based on the common message UI payload.

2. The apparatus of claim 1, further caused to:
   transmit, to the external application, a group-based message generating response in response to the group-based message generating request, the group-based message generating response comprising the common message UI identifier;
   receive, from the external application or the client device, a common message UI update event associated with the common message UI identifier; and
   store an updated common message UI payload to the common message UI repository in association with the common message UI identifier.

3. The apparatus of claim 2, further caused to:
   transmit, using the processor, a common message UI update notification comprising the common message UI identifier to the plurality of group-based communication interface elements associated with the common message UI identifier in parallel or in a selected order.

4. The apparatus of claim 3, further caused to:
   determine, using the processor, whether the common message UI update notification is received;
   in circumstances where the common message UI accessing event is identified among the user interaction data and the common message UI update notification is received:
      retrieve, using the processor, the updated common message UI payload from the common message UI repository using the common message UI identifier; and
      render, to the client device, the common message UI within the additional group-based communication interface element based on the updated common message UI payload.

5. The apparatus of claim 3, wherein the selected order is associated with a most recent access time of the common message UI for each group-based communication interface element.

6. The apparatus of claim 1, further caused to:
receive, from the external application or the client device, a common message UI removal event associated with the common message UI identifier; and
remove, using the processor, the common message UI payload from the common message UI repository in association with the common message UI identifier.

7. The apparatus of claim 1, further caused to:
determine, using the processor, whether the common message UI identifier is associated with at least one of the plurality of group-based communication interface elements; and
in circumstances where the common message UI identifier is determined to be not associated with any one of the plurality of group-based communication interface elements:
remove, using the processor, the common message UI payload from the common message UI repository in association with the common message UI identifier after a time period.

8. The apparatus of claim 1, before retrieving, using the processor, the common message UI payload from the common message UI repository using the common message UI identifier, further caused to:
validate, using the processor, whether the client device is authorized to access the common message UI payload; and
determine, using the processor, whether the common message UI identifier associated with the common message UI payload is generated.

9. The apparatus of claim 1, wherein each of the plurality of group-based communication interface elements is a channel list pane, a channel messaging pane, a flexpane, a message, a channel, or a dashboard.

10. A method for maintaining and updating a common message user interface (UI) shared among a plurality of group-based communication interface elements in a group-based communication system, the method comprising:
receiving, from an external application, a group-based message generating request associated with the common message UI to be rendered within a selected group-based communication interface element of the plurality of group-based communication interface elements;
generating, using a processor, a common message UI identifier and a common message UI payload, wherein the common message UI identifier is stored to a common message UI repository in association with the common message UI payload;
receiving, from a client device, user interaction data associated with an additional group-based communication interface element of the plurality of group-based communication interface elements;
parsing, using the processor, the user interaction data to identify a common message UI accessing event, the common message UI accessing event is associated with the external application and the common message UI identifier;
in circumstances where the common message UI accessing event is identified among the user interaction data:
retrieving, using the processor, the common message UI payload from the common message UI repository using the common message UI identifier; and
rendering, to the client device, the common message UI within the additional group-based communication interface element based on the common message UI payload.

11. The method of claim 10, further comprising:
transmitting, to the external application, a group-based message generating response in response to the group-based message generating request, the group-based message generating response comprising the common message UI identifier;
receiving, from the external application or the client device, a common message UI update event associated with the common message UI identifier; and
storing an updated common message UI payload to the common message UI repository in association with the common message UI identifier.

12. The method of claim 11, further comprising:
transmitting, using the processor, a common message UI update notification comprising the common message UI identifier to the plurality of group-based communication interface elements associated with the common message UI identifier in parallel or in a selected order.

13. The method of claim 12, further comprising:
determining, using the processor, whether the common message UI update notification is received;
in circumstances where the common message UI accessing event is identified among the user interaction data and the common message UI update notification is received:
retrieving, using the processor, the updated common message UI payload from the common message UI repository using the common message UI identifier associated with the updated common message UI; and
rendering, to the client device, the common message UI within the additional group-based communication element based on the updated common message UI payload.

14. The method of claim 12, wherein the selected order is associated with a most recent access time of the common message UI for each group-based communication interface element.

15. The method of claim 10, further comprising:
receiving, from the external application or the client device, a common message UI removal event associated with the common message UI identifier; and
removing, using the processor, the common message UI payload from the common message UI repository in association with the common message UI identifier.

16. The method of claim 10, further comprising:
determining, using the processor, whether the common message UI identifier is associated with at least one of the plurality of group-based communication interface elements; and
in circumstances where the common message UI is determined to be not associated with any one of the plurality of group-based communication interface elements:
removing, using the processor, the common message UI payload from the common message UI repository in association with the common message UI identifier after a time period.

17. The method of claim 10, before retrieving, using the processor, the common message UI payload from the common message UI repository using the common message UI identifier, further comprising:

validating, using the processor, whether the client device is authorized to access the common message UI payload; and determining, using the processor, whether the common message UI identifier associated with the common message UI payload is generated.

18. The method of claim 10, wherein each of the plurality of group-based communication interface elements is a channel list pane, a channel messaging pane, a flexpane, a message, a channel, or a dashboard.

* * * * *